Patented Dec. 13, 1932                                            1,891,203

UNITED STATES PATENT OFFICE

OTTO AMBROS AND HANS REINDEL, OF LUDWIGSHAFEN-ON-THE-RHINE, AND JULIUS EISELE AND JOHANNES STOEHREL, OF MANNHEIM, GERMANY, ASSIGNORS TO I. G. FARBENINDUSTRIE AKTIENGESELLSCHAFT, OF FRANKFORT-ON-THE-MAIN, GERMANY

POLYMERIZATION OF UNSATURATED ORGANIC COMPOUNDS

No Drawing. Application filed January 30, 1930, Serial No. 424,716, and in Germany February 5, 1929.

The present invention relates to the polymerization of unsaturated organic compounds.

We have found that the polymerization of polymerizable unsaturated organic compounds can be accelerated by carrying it out in the presence of one or more metal carbonyls of the heavy metals. The carbonyls of iron, nickel and cobalt are particularly suitable, but also those which are less easily available such as those of molybdenum, tungsten or chromium may be employed. In this manner for example the polymerization of unsaturated fatty acids such as from acrylic up to linoleic or ricinoleic and like long chain acids, or their derivatives such as their esters or mixtures of these substances as for example crude linseed oil may be carried out in a much shorter period of time and in a much simpler manner than by the methods of working hitherto known, in which an acceleration of the reaction is effected for example by the employment of relatively high temperature and pressure. The process according to the present invention may also be employed for the polymerization of unsaturated aliphatic hydrocarbons with more than one double linkage such as the diolefines, butadiene, isoprene and the like, or mixtures thereof, or unsaturated compounds of an aromatic nature such as styrene and the like. If desired the process may be further accelerated by heating to temperatures below that at which a decomposition of the organic substances occurs.

The process may be carried out in a very simple manner for example by adding the metal carbonyl, of which frequently only a small amount is necessary, to the substance to be polymerized and warming the mixture. The quantities employed of the carbonyls are generally between about 0.1 to 10 per cent of the material to be polymerized and depend on the nature of the material and of the carbonyl employed, a quantity of from about 2 to 5 per cent giving usually good results. Cobalt carbonyl is particularly efficient and may be employed therefore in very small quantities such as those near the lower limit of the aforesaid range. In most cases the carbonyls will dissolve in the materials to be polymerized. The metal carbonyls must not be freshly prepared before their application and their efficiency is not reduced when they contain some free very finely divided metal occurring by a partial decomposition by the action of highly active rays, in particular ultra-violet rays, of the daylight, by the action of warm weather or by the presence of chemically active substances, for example agents having a basic action, which partial decomposition also occurs by the application of reduced pressure during the process according to the present invention.

The initial materials employed in the polymerization need not be mono- or bi-molecular substances as for example butadiene, or cyclic di-butene (tetrahydrostyrene) but the polymerization according to the present invention may be also carried out with polymerizable products which have already attained a certain degree of polymerization and may be further polymerized in accordance with the present invention. Thus for example butadiene or isoprene or like diolefine or mixtures thereof, may be polymerized in any known manner to form a more or less viscous mass, for example by keeping standing or by heating the said diolefines or aqueous emulsions thereof, or with the aid of a catalyst such as an alkali metal or peroxide or by treatment with high frequency currents, which masses are then converted into elastic solid products by a treatment according to the present invention. Both the polymerizations may also be carried out in the presence of organic solvents such as aromatic hydrocarbons or petroleum fractions, esters or ketones, carbon tetrachloride or mixtures of one or more of these solvents with alcohols and like organic solvents as are employed in the lacquer industries. The application of solvents is particularly advantageous in the polymerization of highly viscous polymerization products and allows even of further polymerizing solid elastic polymerization products to form hard, practically unelastic products which are non-resilient to pressure but can be bent without breaking. This polymerization of partially polymerized diolefines is preferably carried out in the presence of oxygen, which may be supplied as such or in the form of mixtures containing free oxygen, such as air, or of agents supplying oxygen such as peroxides or ozonides, or both, and can be further accelerated by adding small quantities such as from about 0.1 to 5 per cent of the polymerization product, of an oxygen transferrer such as heavy metal salts of high molecular fatty, resinic or naphthenic acids. Particularly valuable transferrers of oxygen are the heavy metal salts of sulphonic acids of organic compounds or mixtures of the same, such as the said salts of polynuclear aromatic sulphonic acids, for example naphthalene sulphonic acids in which the aromatic nucleus may contain alkyl or aralkyl radicles such as propyl, butyl, or benzyl radicles, of sulphonic acids of phenols or naphthols or of halogenated hydrocarbons or nitrogenous bases such as aniline, naphthylamine or pyridines, or sulphonic acids prepared from coal tar or mineral oils as well as sulphonic acids of aliphatic compounds such as can be obtained from paraffin oil, vegetable oils or fats or from the acids contained in the last mentioned materials. The metals of the said salts may be chosen from nickel, iron, cobalt, lead, manganese and the like and mixtures of the salts may be employed. The process according to the present invention may be advantageously employed in the manufacture of coatings, films, discs, threads and the like or in the joining together of materials with the employment of unsaturated polymerization products of hydrocarbons of the butadiene series which are capable of being further polymerized. If desired the action of the carbonyls may be also assisted by a small quantity of solid or dissolved sulphur. When the polymerization has been carried out without heating to high temperatures the products will contain remainders of the metal carbonyl employed.

The following examples will further illustrate the nature of this invention, but the invention is not restricted thereto.

Example 1

100 kilograms of purified linseed oil having the following characteristics: iodine value 180, acid value 5, saponification value 190, viscosity at 20° centigrade 7° Engler are well mixed with 1 litre of iron carbonyl. When the mixture is gradually heated to 300° centigrade with the simultaneous introduction of carbon dioxide the viscosity of the linseed oil increases rapidly with the decomposition of the iron carbonyl. The polymerization is completed after about from 4 to 5 hours and the characteristics of the product obtained are: iodine value 120, acid value 15, saponification value 190 and viscosity at 50° centigrade from 800° to 1000° Engler. After heating for a further 1 to 2 hours at 300° centigrade the polymerization product is converted into an elastic product.

Example 2

100 parts by weight of linseed oil having the following characteristics: iodine value 180, acid value 5, saponification value 190, viscosity at 20° centigrade 7° Engler, are incorporated with 0.35 part by weight of cobalt carbonyl the mixture being then gradually heated to about 300° centigrade while passing through carbon dioxide. After five hours a jelly is obtained.

Example 3

1000 parts by weight of isoprene are mixed with 20 parts by weight of iron carbonyl and slightly warmed while passing air into the mixture. After some time the liquid becomes sticky and its viscosity rises. The polymerization product can be drawn to threads like glue and be worked to rubber-like articles in any convenient manner.

Example 4

An oily polymerization product of butadiene prepared by heating 100 parts of butadiene in 200 parts of toluene for several hours to about 200° C., is painted in a thin layer on a substratum after the addition of 1 per cent by weight of the chromium salt of a propyl naphthalene sulphonic acid and of 0.5 per cent by weight of nickel carbonyl. The covering hardens in one tenth of the time taken without the said addition and yields a flexible, firm, lustrous coating. The hardening may be further accelerated by heating to about 95° C.

By replacing the chromium salt employed by the same amount of iron pentacarbonyl, a rapid hardening is likewise effected.

Example 5

An oily polymerization product obtained from butadiene is incorporated with 2 per cent its weight of iron carbonyl. When painted onto a substratum in a thin layer the polymerization product dries in the air to a solid elastic coating in about one fifth of the period required when the product is applied without the addition of iron carbonyl. The hardening may be further accelerated by heating to about 95° C. If desired, about 0.5 per cent by weight of the polymerization product of sulphur chloride, or of sulphur dissolved in a little carbon disulphide, may be added together with the iron carbonyl.

What we claim is:—

1. The process for the polymerization of polymerizable unsaturated, liquid organic compounds which comprises incorporating the said compounds with a small quantity of a carbonyl of a heavy metal.

2. The process for the polymerization of polymerizable unsaturated, liquid organic compounds which comprises warming the said compounds in the presence of a small quantity of a carbonyl of a heavy metal.

3. The process for the polymerization of polymerizable unsaturated, liquid organic compounds which comprises warming the said compounds in the presence of from 0.1 to 10 per cent their weight of a carbonyl of a heavy metal.

4. The process for the polymerization of polymerizable unsaturated, liquid organic compounds which comprises incorporating the said compounds with a small quantity of a carbonyl of a heavy metal and exposing the mixture to the action of oxygen.

5. The process for the polymerization of polymerizable unsaturated, liquid organic compounds which comprises incorporating the said compounds with a small quantity of a carbonyl of a heavy metal and of an oxygen transferrer, and exposing the mixture to the action of oxygen.

6. The process for the polymerization of polymerizable unsaturated, liquid organic compounds which comprises incorporating the said compounds with a small quantity of a carbonyl of a heavy metal and of a heavy metal salt of a sulphonic acid of an organic compound, and exposing the mixture to the action of oxygen.

7. The process for the polymerization of polymerizable unsaturated, liquid organic compounds which comprises incorporating the said compounds with a small quantity of a carbonyl of a heavy metal and of a heavy metal salt of a sulphonic acid of a polynuclear aromatic compound, and exposing the mixture to the action of oxygen.

8. The process for the polymerization of polymerizable unsaturated, liquid organic compounds which comprises incorporating the said compounds with a small quantity of a carbonyl of a heavy metal, and of a heavy metal salt of a sulphonic acid of a polynuclear aromatic compound containing alkyl radicles and exposing the mixture to the action of oxygen.

9. The process for the polymerization of polymerizable unsaturated, liquid organic compounds which comprises warming a diolefine in the presence of a small quantity of a carbonyl of a heavy metal.

10. The process for the polymerization of polymerizable unsaturated, liquid organic compounds which comprises incorporating a polymerizable polymerization product of a diolefine with a small quantity of a carbonyl of a heavy metal and exposing the mixture to the action of oxygen.

11. The process for the polymerization of polymerizable unsaturated, liquid organic compounds which comprises incorporating a polymerizable polymerization product of a diolefine with from 0.1 to 10 per cent its weight of a carbonyl of a heavy metal and exposing the mixture to the action of oxygen.

12. The process for the polymerization of polymerizable unsaturated, liquid organic compounds which comprises incorporating a polymerizable polymerization product of a diolefine with from 0.1 to 10 per cent its weight of a carbonyl of a heavy metal and of an oxygen transferrer and exposing the mixture to the action of oxygen.

13. The process for the polymerization of polymerizable unsaturated, liquid organic compounds which comprises incorporating a polymerizable polymerization product of a diolefine with from 0.1 to 10 per cent its weight of a carbonyl of a heavy metal and with an organic solvent and exposing the mixture to the action of oxygen.

14. The process for the polymerization of polymerizable unsaturated, liquid organic compounds which comprises heating polymerizable unsaturated organic acids and their esters in the presence of a small quantity of a carbonyl of a heavy metal.

15. As new articles of manufacture from oily viscous to solid polymerization products of polymerizable unsaturated, liquid organic compounds containing small quantities of a carbonyl of a heavy metal.

16. The process for the polymerization of polymerizable unsaturated, liquid organic compounds which comprises incorporating a polymerizable polymerization product of a diolefine with from 0.1 to 10 per cent its weight of a carbonyl of a heavy metal.

17. The process for the polymerization of polymerizable unsaturated, liquid organic compounds which comprises incorporating the said compounds with a small quantity of a carbonyl of a heavy metal and of a heavy metal salt of a sulphonic acid of an organic compound.

18. The process for the polymerization of polymerizable unsaturated liquid organic compounds which comprises incorporating linseed oil with a small quantity of a carbonyl of a heavy metal selected from the group consisting of iron, cobalt and nickel, and then gradually warming the mixture to about 300° C.

19. The process for the polymerization of polymerizable unsaturated liquid organic compounds which comprises incorporating linseed oil with a small quantity of iron carbonyl and then gradually warming the mixture to about 300° C., while introducing carbon dioxide.

20. The process for the polymerization of polymerizable unsaturated liquid organic compounds which comprises incorporating a polymerizable polymerization product of a diolefine with a small quantity of iron carbonyl, painting the mixture onto a substratum in a thin layer and warming the whole up to 95° C.

21. The process for the polymerization of polymerizable unsaturated liquid organic compounds which comprises incorporating a polymerizable polymerization product of a diolefine with a small quantity of iron carbonyl, painting the mixture onto a substratum in a thin layer and then heating to about 95° C.

22. As new articles of manufacture solid substrata having a superficial thin coating of a polymerization product of a diolefine containing a small quantity of iron carbonyl.

23. As a new article of manufacture polymerized butadiene containing a small quantity of iron carbonyl.

24. As a new article of manufacture polymerized linseed oil containing a small quantity of iron carbonyl.

In testimony whereof we have hereunto set our hands.

OTTO AMBROS.
HANS REINDEL.
JULIUS EISELE.
JOHANNES STOEHREL.